United States Patent [19]
Kontu

[11] Patent Number: 5,823,253
[45] Date of Patent: Oct. 20, 1998

[54] PLATE HEAT EXCHANGER AND METHOD FOR ITS MANUFACTURE

[76] Inventor: Mauri Kontu, Vahterus, FIN-23660, Kalanti, Finland

[21] Appl. No.: 666,364
[22] PCT Filed: Dec. 16, 1994
[86] PCT No.: PCT/FI94/00567
  § 371 Date: Aug. 12, 1996
  § 102(e) Date: Aug. 12, 1996
[87] PCT Pub. No.: WO95/17272
  PCT Pub. Date: Jun. 29, 1995

[30] Foreign Application Priority Data

Dec. 20, 1993 [FI] Finland .................................. 935745

[51] Int. Cl.$^6$ ..................................................... F28F 3/08
[52] U.S. Cl. ............................ 165/167; 165/166; 72/385
[58] Field of Search ............................... 72/385; 165/166, 165/167

[56] References Cited

U.S. PATENT DOCUMENTS

| | | | |
|---|---|---|---|
| 2,186,288 | 1/1940 | Gallagher | 72/385 |
| 3,748,888 | 7/1973 | Gerich | 72/385 |
| 4,176,713 | 12/1979 | Fisher | 165/166 |
| 4,450,706 | 5/1984 | Engelmohr | 72/385 |
| 4,635,462 | 1/1987 | Bald | 72/385 |
| 4,660,633 | 4/1987 | Fischer | 165/167 |
| 4,664,183 | 5/1987 | Fischer | 165/166 |
| 5,088,552 | 2/1992 | Raunio | 165/166 |

FOREIGN PATENT DOCUMENTS

| | | | |
|---|---|---|---|
| 0146352 | 6/1985 | European Pat. Off. | 72/385 |
| 2639371 | of 1977 | Germany. | |
| 3536316 | of 1987 | Germany. | |
| 613192 | of 1978 | U.S.S.R. . | |
| 2174488 | of 0000 | United Kingdom . | |
| 0003308 | 1/1894 | United Kingdom | 72/385 |
| 8900671 | of 0000 | WIPO . | |

*Primary Examiner*—John Rivell
*Assistant Examiner*—Christopher Atkinson
*Attorney, Agent, or Firm*—Ladas & Parry

[57] ABSTRACT

The invention relates to a plate heat exchanger and a method for its manufacture. Round, corrugated heat-transfer plates are made of round plate blanks in a pressing tool (1) having protuberances (3) or grooves (4) on the surface for forming the corrugations. The locations of flow openings can be selected by means of filling pieces (9) that are positioned in spaces (5) provided for them, depending on whether a flow opening or a normal corrugation is to be formed in a specific location. The method is intended for manufacturing plate heat exchangers where the ridges of plates placed on top of each other are crosswise, and the angle between them can be selected as desired.

12 Claims, 3 Drawing Sheets

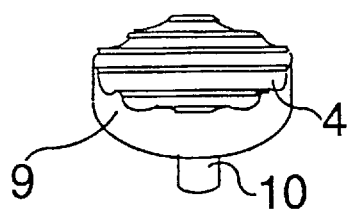
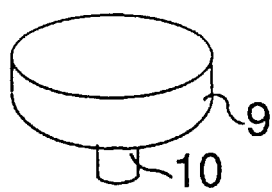
FIG 4  FIG 5
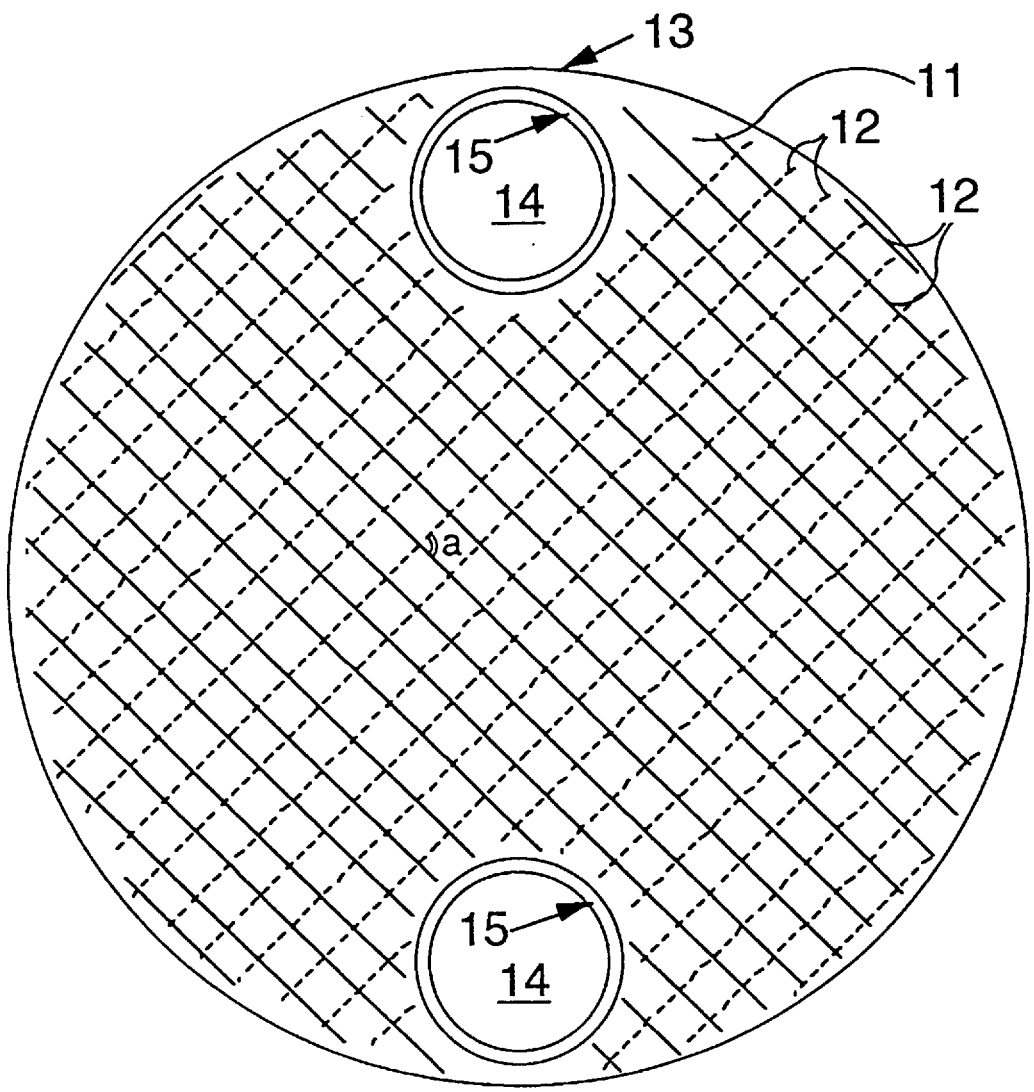
FIG 6

PLATE HEAT EXCHANGER AND METHOD FOR ITS MANUFACTURE

The invention relates to a heat exchanger made of round, corrugated plates interconnected in pairs along the outer circumference, the pairs of plates being interconnected at flow openings so that the primary side will be closed. A tool for manufacturing the corrugated plates of the device is so designed that the angle between the corrugations of adjacent plates can be varied within certain limits. The manufacturing method according to the invention comprises the use of a single pressing tool.

A conventional plate-structure heat exchanger is usually rectangular, and flow passages on both the primary and the secondary side are positioned within the stack of plates. Passages between the plates and ridge profiles vary in plate heat exchanges. The angle between the ridges of opposite plates affects substantially the flow conditions in the passage between the plates. Conventional plate heat exchangers have required several separate pressing tools for each ridge angle. The method is expensive, and it has not been possible to adjust the ridge angles sufficiently accurately. Ridge angles between the plates have been adjustable to some extent by arranging together plates made with different tools.

Finnish Patent Specification 79 409 describes a plate heat exchanger made of round, corrugated plates. In the solution the ridge angles between the adjacent plates can be varied freely. However, the publication does not disclose any detailed technical solution for realizing the construction described in it. This construction is not obvious to one skilled in the art, as it comprises technical details that have not been solved. Accordingly, the corner between the chambers 4 and the plates 1 has not been sealed, as a result of which flows will inevitably intermix in the different passages between the plates. The publication does not disclose how this sealing is realized. Of course, the sealing can be made by soldering or welding, but this makes the chambers 4 extremely expensive in construction. In addition, in the construction according to the publication, it is very expensive to tighten the end plates by means of bolts particularly if the plate heat exchanger is used as a high-pressure pressure vessel. As a matter of fact, the solution according to the invention is speculative rather than technically realizable. Finnish Published Specification 64 459 also describes a round, plate heat exchanger solution. This construction, however, differs essentially from the plate heat exchanger and manufacturing method according to the present patent application. The plate heat exchanger disclosed in the published specification differs completely in flow type from the heat exchanger according to the invention. It employs a spiral-type solution, whereby the device solution is different as regards flows and flow resistances.

A drawback of present-day plate-structure heat exchangers is undoubtedly the method for their manufacture, if the ridge angle has to be varied due to heat-exchanging media, which is usually difficult with the constructions used at present. The costs of the tools for manufacturing plate heat exchangers are usually so high that the manufacture of small series is not feasible. In addition, conventional plate heat exchangers provided with rubber gaskets and pressed between end plates are disadvantageous in construction from the point of view of service life. A problem with rubber gaskets is that they begin to leak when aging. The service life can be increased to some extent by various soldering or welding techniques. In most cases, this, however, eliminates the advantage offered by conventional plate heat exchangers, i.e. that they can be disassembled and cleaned.

The device according to the invention and the method for its manufacture provide a decisive improvement with respect to the above-described drawbacks. To achieve this, the device according to the invention is characterized by what is disclosed in the accompanying claims.

The most important advantage of the invention is that plate heat exchangers with adequately stepped ridge angles can be produced by a single pressing tool. The construction of the plate heat exchanger according to the invention is highly resistant to pressure. In addition, considerable savings are obtained as the manufacture of pressing tools is very expensive and a single tool with its supplementary parts can replace 4 to 5 pressing tools. Being a welded construction, the heat exchanger has a longer service life than conventional plate heat exchanges with rubber gaskets.

In the following the invention will be described in detail with reference to the attached drawings.

FIG. 4 shows a grooved filling piece.

FIG. 5 shows a filling piece with a smooth surface.

FIG. 6 illustrates schematically the heat-transfer plates when placed on top of each other.

In the following the invention will be described in detail with reference to the attached drawings.

Figure 1:
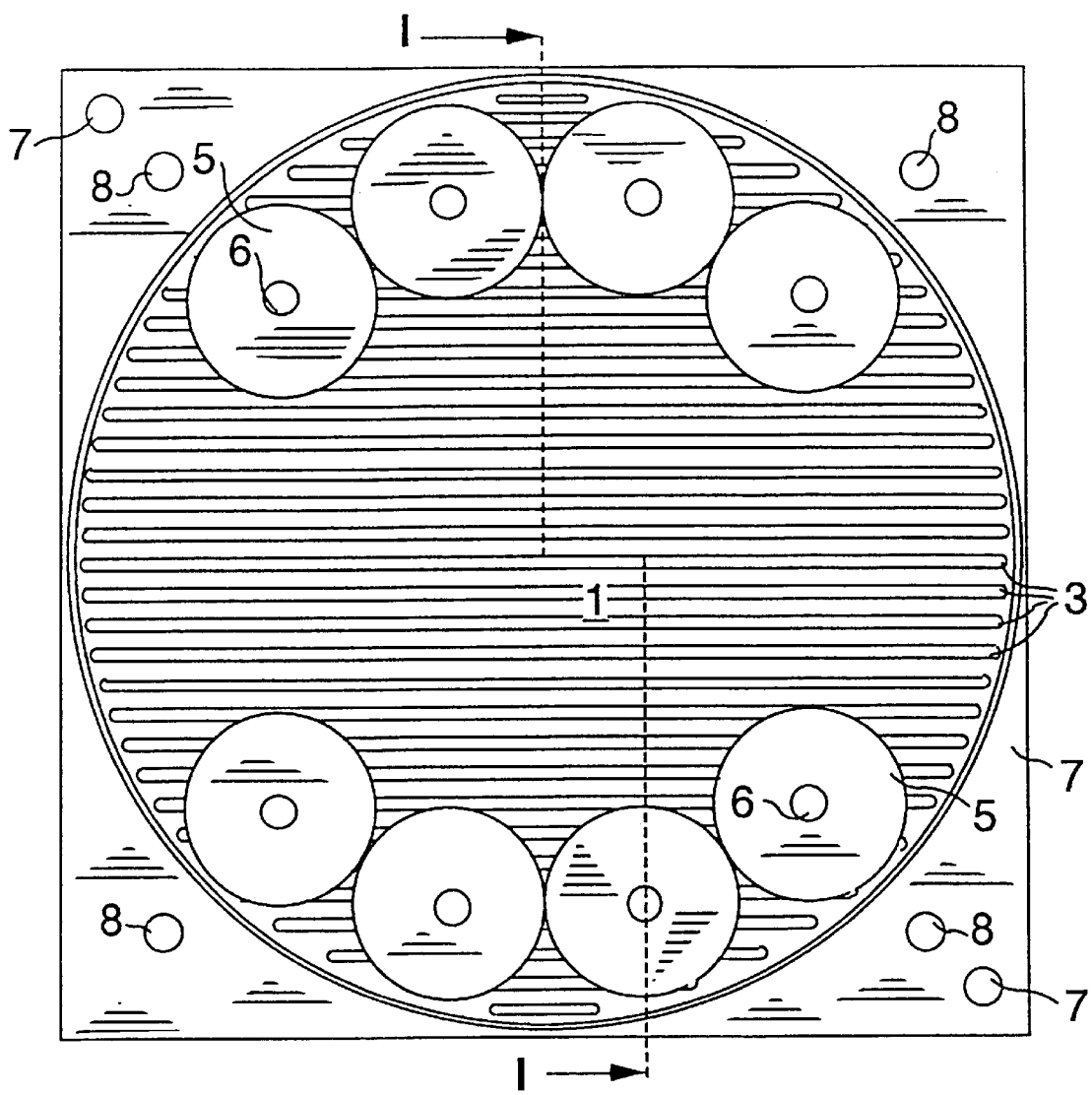
FIG. 1 is a top view of the press portion of a pressing tool for a heat-transfer plate.
Figure 2:
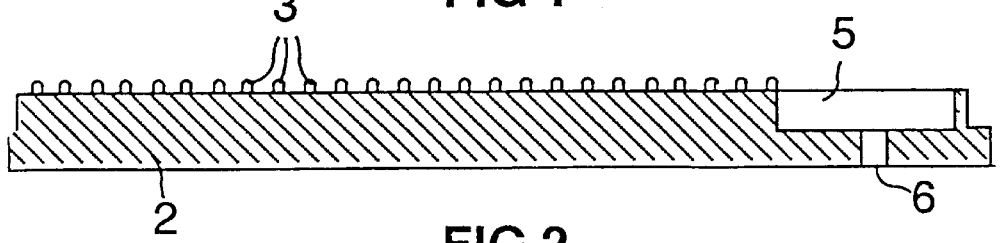
FIG. 2 is a sectional view of the tool shown in FIG. 1.
Figure 3:
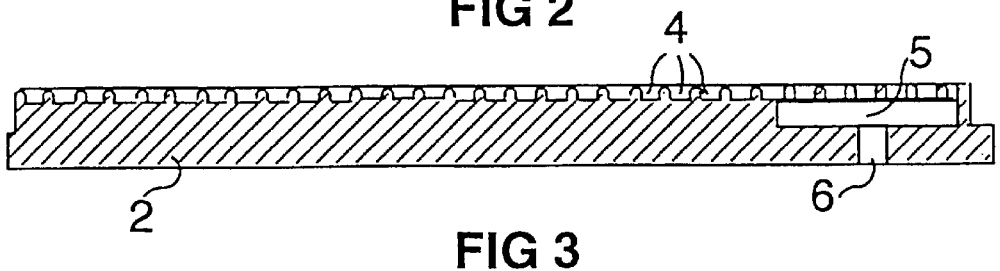
FIG. 3 is a similar sectional view of the counterpart.
Figure 7:
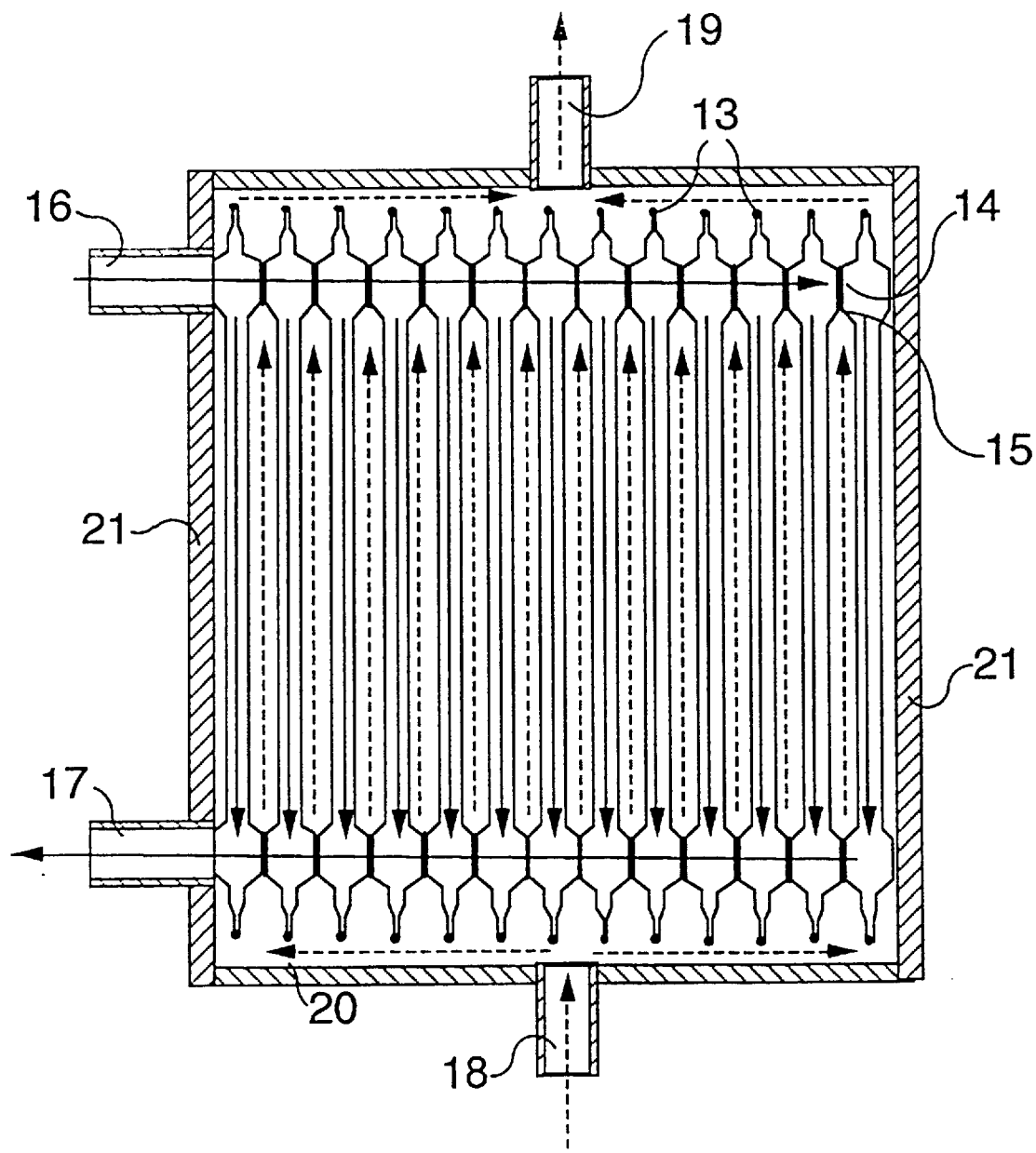
FIG. 7 illustrates schematically a plate heat exchanger manufactured according to the invention.

In FIGS. 1 to 5, reference numeral 1 denotes a pressing tool. Numeral 2 denotes the body of the pressing tool, and numeral 3 protuberances by means of which a heat-transfer plate is corrugated. Numeral 4 denotes grooves into which the protuberances 3 are pressed when the heat-transfer plate is pressed into shape. A space for filling pieces is indicated with numeral 5, and a hole for a fastening pin with numeral 6. Guide pins for the pressing tool are denoted with numeral 7, and guide holes with numeral 8. The filling piece is indicated with numeral 9, and the fastening pin with numeral 10. In FIGS. 6 and 7, the heat-transfer plate is denoted with numeral 11, and ridges of corrugations formed in the plate with numeral 12. An angle between the ridges of adjacent plates is indicated with letter a. Plates are welded together in pairs along the outer circumference 13 of the plates, and each pair of plates is welded to another pair of plates along the circumference 15 of a flow opening 14. On the primary side, an inlet fitting is indicated with numeral 16 and an outlet fitting with numeral 17. On the secondary side, an inlet fitting is indicated with numeral 18 and an outlet fitting with numeral 19. The shell of the heat exchanger is indicated with numeral 20 and end plates with numeral 21.

Heat exchangers according to the invention are manufactured in the following way. The pressing tools 1 comprise a press and a counterpart, one of which is provided with protuberances 3 and the other with grooves 4, whereby a heat-transfer plate to be formed will be corrugated when pressed between them. Either the protuberances 3 or grooves 4 are milled in the body 2 of the pressing tool 1. In addition, the spaces 5 are milled in the pressing tools for the filling pieces 9 and the holes 6 for fastening. The diameter of the filling piece 9 and that of the space 5 provided for the filling piece, of course, define the size of the flow opening 14. The location of the flow opening 14 depends on which one of the spaces 5 the filling piece 9 with a smooth surface is positioned. In the tool described in the present patent application, the spaces 5 are stepped with intervals of 30°, which means that stepping of 15° will be obtained in determining the ridge angle a between the plates. When the plates 11 have been pressed into shape, and the flow openings 14 have been provided in them at desired locations with respect to the ridges 12, the plates are stacked on top of each other in such a way that the pairs of plates are welded together along the outer circumference 13, after which the pairs of plates are welded to each other along the circumferences 15 of the flow openings 14. The obtained closed flow passage arrangement of the primary circuit is positioned within the outer shell 20 of the heat exchanger, and the ends 21 are mounted in position. The flow normally takes place in the heat exchanger as shown in FIG. 7, where the arrows drawn by solid lines illustrate flow on the primary side and the arrows drawn by broken lines illustrate flow on the secondary side.

Within the inventive idea the tool 1 can, of course, be modified e.g. in such a way that the number of the filling pieces 9 is greater than in this specific solution, the diameter of the filling piece and that of the opening 5 being thus decreased. On the contrary, it is also possible to decrease the number of the openings, whereby the flow openings 14 in the plate heat exchanger will be greater, which allows the plate heat exchanger to be made longer, as the resistance of the flow opening 14 will not be too high. The filling pieces 9 may also be fastened in the hole 6 by means of the pin 10 by using other kind of construction, e.g. by means of several fastening elements. The protuberances 3 and grooves 4 may also be grouped in the pressing tools 1 in some other way or mounted at another angle without falling outside the inventive idea.

I claim:

1. In a method for making a plate heat exchanger wherein plate blanks of round shape are formed with corrugations and flow openings and are then connected together so that corrugations of adjacent of the plate blanks define a ridge angle that determines a flow characteristic of fluid passing between adjacent corrugated blanks, the improvement comprising forming the plate blanks with a pressing tool comprising (a) press means, including a press body and a counterpart body, for pressing the plate blanks, said press body comprising at least first and second pairs of spaces with one space of the first pair positioned opposite a second space of the first pair at an equal distance from a center of the press body and with one piece of the second pair positioned opposite a second space of the second pair at an equal distance from the center of the press body, said press body comprising protuberances or grooves, said counterpart body comprising grooves if the press body comprises protuberances, or protuberances if the press body comprises grooves, such that plate blanks, when pressed between the press body and the counterpart body, are formed with the corrugations;

(b) filling means comprising a plurality of first filling pieces for selectively filling spaces in the first or second pairs and for defining flow openings in the plate blanks, said first filling pieces being selectively inserted into either the first or second pairs of spaces; and (c) a plurality of second filling pieces inserted into the first or second pairs of spaces that are not filled with the first filling pieces, said second filling pieces comprising protuberances if the press body comprises protuberances, or grooves if the press body comprises grooves, said first and second filling pieces being selectively insertable into spaces of either the first or second pairs of spaces such that said filling means can be used to define flow openings in any one of a plurality of alternative arrangements in the plate blanks whereby the ridge angle defined by corrugations of adjacent plate blanks can be varied by changing an arrangement of the first and second filling pieces when forming the plate blanks.

2. A method as claimed in claim 1, wherein the counterpart body has spaces that are aligned with the first and second pairs of spaces with the plate blanks pressed between the counterpart body and the press body.

3. A method as claimed in claim 2, further comprising changing the arrangement of the first and second filling pieces in the spaces of the first and second pairs so as to make corrugated plate blanks of changed surface configuration whereby to vary the ridge angle defined by corrugations of adjacent plate blanks.

4. A method as claimed in claim 2, further comprising interconnecting pair of the corrugated plate blanks along their circumference and interconnecting other pairs of the corrugated plate blanks along circumferences of the flow openings.

5. A method as claimed in claim 4 comprising forming the plate heat exchanger with a primary side, wherein adjacent plate blanks define a primary ridge angle, and a secondary side, wherein adjacent plate blanks define a secondary ridge angle, said primary and secondary ridge angles being equal.

6. A method as claimed in claim 4 comprising forming the plate heat exchanger with a primary side, wherein adjacent plate blanks define a primary ridge angle, and a secondary side, wherein adjacent plate blanks define a secondary ridge angle, said primary and secondary ridge angles being unequal.

7. A plate heat exchanger made by the method of claim 1.

8. A plate heat exchanger made by the method of claim 4.

9. A plate heat exchanger made by the method of claim 5.

10. A plate heat exchanger made by the method of claim 6.

11. A pressing tool for making corrugated plate blanks that are round in shape, said tool comprising (a) press means, including a press body and a counterpart body, for pressing the plate blanks, said press body comprising at least first and second pairs of spaces with one space of the first pair positioned opposite a second space of the first pair at an equal distance from a center of the press body and with one piece of the second pair positioned opposite a second space of the second pair at an equal distance from the center of the press body, said press body comprising protuberances or grooves, said counterpart body comprising grooves if the press body comprises protuberances, or protuberances if the press body comprises grooves, such that plate blanks, when pressed between the press body and the counterpart body, are formed with corrugations;

(b) filling means comprising a plurality of first filling pieces for selectively filling spaces in the first or second pairs and for defining flow openings in the plate blanks, said first filling pieces being selectively insertable into either the first or second pairs of spaces; and (c) a plurality of second filling pieces insertable into the first and or second pairs of spaces that are not filled with the first filling pieces, said second filling pieces comprising protuberances if the press body comprises protuberances, or grooves if the press body comprises grooves, said first and second filling pieces being selectively insertable into spaces of either the first or second pairs of spaces such that said filling means can be used to define flow openings in any one of a plurality of alternative arrangements in the plate blanks whereby a configuration of the corrugations of the plate blanks can be varied by changing an arrangement of the first and second filling pieces in the spaces of the first and second pairs when forming the plate blanks.

12. A tool as claimed in claim 11, wherein the counterpart body has spaces that are aligned with the first and second pairs of spaces with the plate blanks pressed between the counterpart body and the press body.

* * * * *